United States Patent
Devarakonda et al.

(10) Patent No.: US 8,185,779 B2
(45) Date of Patent: *May 22, 2012

(54) CONTROLLING COMPUTER STORAGE SYSTEMS

(75) Inventors: Murthy V. Devarakonda, Peekskill, NY (US); Konstantinos Magoutis, New York, NY (US); Norbert George Vogl, Mahopac, NY (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 144 days.

This patent is subject to a terminal disclaimer.

(21) Appl. No.: 12/130,216

(22) Filed: May 30, 2008

(65) Prior Publication Data

US 2008/0228687 A1    Sep. 18, 2008

Related U.S. Application Data

(63) Continuation of application No. 11/475,496, filed on Jun. 27, 2006.

(51) Int. Cl.
*G06F 11/00* (2006.01)
(52) U.S. Cl. ............... 714/13; 714/6.2; 714/6.22
(58) Field of Classification Search .......... 714/13, 714/6.2, 6.22
See application file for complete search history.

(56) References Cited

U.S. PATENT DOCUMENTS

| | | | | |
|---|---|---|---|---|
| 5,331,579 A | * | 7/1994 | Maguire et al. | 703/2 |
| 5,339,427 A | * | 8/1994 | Elko et al. | 718/103 |
| 5,592,618 A | * | 1/1997 | Micka et al. | 714/54 |
| 5,603,029 A | * | 2/1997 | Aman et al. | 718/105 |
| 5,719,884 A | | 2/1998 | Roth et al. | |
| 6,195,624 B1 | * | 2/2001 | Woodman et al. | 703/7 |
| 6,256,748 B1 | * | 7/2001 | Pinson | 714/6 |
| 6,397,348 B1 | | 5/2002 | Styczinski | |
| 6,993,458 B1 | | 1/2006 | Castelli et al. | |
| 7,035,971 B1 | * | 4/2006 | Merchant | 711/114 |
| 7,062,621 B2 | * | 6/2006 | Mizuno et al. | 711/162 |
| 7,096,336 B2 | * | 8/2006 | Furuhashi et al. | 711/165 |
| 7,219,204 B2 | * | 5/2007 | Shackelford | 711/162 |
| 7,246,161 B2 | * | 7/2007 | Fujita et al. | 709/223 |
| 7,254,744 B2 | * | 8/2007 | Dunstan et al. | 714/24 |
| 7,263,476 B1 | * | 8/2007 | Dellacona | 703/13 |
| 7,383,462 B2 | * | 6/2008 | Osaki et al. | 714/2 |
| 7,406,617 B1 | * | 7/2008 | Athreya et al. | 714/4 |
| 7,475,213 B2 | * | 1/2009 | Matsuda et al. | 711/170 |
| 7,480,912 B2 | | 1/2009 | Arnold et al. | |
| 7,493,300 B2 | | 2/2009 | Palmer et al. | |

(Continued)

OTHER PUBLICATIONS

Crespo et al, "Cost-Driven Design for Archrival Repositories," JCDL '01, Computer Science Department, Standford University (2000).

(Continued)

*Primary Examiner* — Scott Baderman
*Assistant Examiner* — Loan L. T. Truong
(74) *Attorney, Agent, or Firm* — Ryan, Mason & Lewis, LLP

(57) ABSTRACT

Goal-based availability and change management are handled over groups of heterogeneous storage controllers. Probabilistic and deterministic methods are employed to determine the allocation and placement of storage volumes to storage controllers, as well as the degree of data redundancy necessary to achieve data availability goals The probabilistic methods can take into account past observations of controller availability, and operator beliefs, as well as the state of storage controller configuration, in coming up with a probabilistic estimate of future availability.

20 Claims, 5 Drawing Sheets

U.S. PATENT DOCUMENTS

| | | | |
|---|---|---|---|
| 7,626,717 B2* | 12/2009 | Rai et al. | 358/1.15 |
| 7,689,743 B2* | 3/2010 | Eastman et al. | 710/58 |
| 2001/0051861 A1 | 12/2001 | Tamura et al. | |
| 2002/0174419 A1 | 11/2002 | Alvarez et al. | |
| 2003/0061264 A1* | 3/2003 | Benhase et al. | 709/105 |
| 2003/0110263 A1 | 6/2003 | Shillo | |
| 2003/0135783 A1 | 7/2003 | Martin et al. | |
| 2003/0220899 A1 | 11/2003 | Numanoi et al. | |
| 2003/0225801 A1 | 12/2003 | Devarakonda et al. | |
| 2004/0117369 A1 | 6/2004 | Mandal et al. | |
| 2004/0221123 A1* | 11/2004 | Lam et al. | 711/202 |
| 2004/0243692 A1* | 12/2004 | Arnold et al. | 709/220 |
| 2004/0260973 A1* | 12/2004 | Michelman | 714/13 |
| 2005/0024695 A1* | 2/2005 | Prakash | 358/504 |
| 2005/0066078 A1* | 3/2005 | Yagisawa et al. | 710/33 |
| 2005/0076154 A1* | 4/2005 | Chambliss et al. | 710/1 |
| 2005/0138285 A1 | 6/2005 | Takaoka et al. | |
| 2005/0144538 A1 | 6/2005 | Lawrence et al. | |
| 2005/0154852 A1 | 7/2005 | Nakagawa et al. | |
| 2005/0198455 A1* | 9/2005 | Yagawa et al. | 711/162 |
| 2005/0210096 A1 | 9/2005 | Bishop et al. | |
| 2005/0234919 A1* | 10/2005 | Maya et al. | 707/10 |
| 2006/0004889 A1* | 1/2006 | Shackelford | 707/204 |
| 2006/0080503 A1* | 4/2006 | Araki et al. | 711/113 |
| 2006/0095656 A1 | 5/2006 | Ueoka et al. | |
| 2006/0117300 A1* | 6/2006 | Puthukattukaran et al. | 717/124 |
| 2006/0129779 A1 | 6/2006 | Cannon et al. | |
| 2006/0155591 A1* | 7/2006 | Altaf et al. | 705/5 |
| 2006/0161753 A1 | 7/2006 | Aschoff et al. | |
| 2006/0215574 A1* | 9/2006 | Padmanabhan et al. | 370/252 |
| 2006/0218203 A1* | 9/2006 | Yamato et al. | 707/200 |
| 2006/0271601 A1* | 11/2006 | Fatula et al. | 707/201 |
| 2006/0277384 A1* | 12/2006 | Yagawa et al. | 711/170 |
| 2007/0061180 A1 | 3/2007 | Offenberg | |
| 2007/0143497 A1 | 6/2007 | Kottomtharayil et al. | |
| 2007/0180087 A1 | 8/2007 | Mizote et al. | |
| 2007/0186068 A1 | 8/2007 | Agrawal | |
| 2007/0198797 A1* | 8/2007 | Kavuri et al. | 711/165 |
| 2007/0283125 A1* | 12/2007 | Manczak et al. | 711/207 |
| 2008/0120462 A1 | 5/2008 | Nehse | |
| 2009/0094380 A1 | 4/2009 | Qiu et al. | |

OTHER PUBLICATIONS

Keller et al., "The CHAMPS System: Change Management with Planning and Scheduling," IBM Research Division, RC22882 (W0308-089) (Aug. 25, 2003).

Gray, Jim, "Why Do Computers Stop and What Can Be Done About It?" Technical Report 85.7, PN87614, Tandem Computers (Jun. 1985, rev. Nov. 1985).

Baek et al., "Reliability and Performance of Hierarchical RAID with Multiple Controllers," Electronics and Telecommunications Research Institute, Daejeon, Korea (2001).

Patterson et al., "A Case for Redundant Arrays of Inexpensive Disks (RAID)," Computer Science Division, Department of Electrical Engineering and Computer Sciences, University of California, Berkeley (1988).

Bhagwan et al., "Total Recall: System Support for Automated Availability Management," Department of Computer Science and Engineering, University of California, San Diego (2004).

Spiegel, Murray R., "Schaum's Outline of Theory and Problems of Probability and Statistics," McGraw-Hill, pp. 5-7 (1975).

"IBM TotalStorage Productivity Center User's Guide," Version 3 Release 1, International Business Machines, pp. 1-17, 359-378 (Feb. 2006).

Verma A., et al, "An Architecture for Lifecycle Management in Very Large File Systems"; Proceedings of the 22nd IEEE/13th NASA Goddard Conference on Mass Storage Systems and Technologies (MSST 2005); retrieved Sep. 25, 2007.

Beigi, M. et al., Policy-Based Information Lifecycle Management in a Large-Scale File System ; Swedish Institute of Compute Science IEEE 6th International Workshop on Policies for Distributed Systems and Networks, Jun. 6-8, 2005.

Dasgupta, G et al QoS-GRAF: A Framework for QoS based Grid Resource Allocation with Failure provisioning; Proceedings of 14th IEEE International Workshop on Quality of Service (IWQoS) Jun. 19-21, 2006.

* cited by examiner

CONTROLLING COMPUTER STORAGE SYSTEMS

CROSS-REFERENCE TO RELATED APPLICATIONS

This application is a continuation of U.S. patent application Ser. No. 11/475,496, filed Jun. 27, 2006, incorporated by reference herein.

FIELD OF THE INVENTION

The present invention generally relates to information technology, and, more particularly, to controlling computer storage systems.

BACKGROUND OF THE INVENTION

The need for scaling the capacity, availability, and performance of datasets across multiple direct-access storage devices (DASDs) led to the development of the Redundant Array of Inexpensive (or Independent) Disks (RAID) technology in the early 1980s, and the implementation of storage controllers that offer RAID-based logical disk abstractions. These storage controllers are typically computer servers attached to a large number of DASDs via a peripheral I/O interconnect. They form RAID arrays by combining groups of DASDs and subsequently create and export logical disk abstractions over these RAID arrays. The RAID technology protects against data loss due to DASD failure by replicating data across multiple DASDs and by transparently reconstructing lost data onto spare DASDs in case of failure. Depending on the degree of overall storage controller availability desired (which directly affects cost), storage vendors have several options regarding the reliability and redundancy of components used when designing storage controllers. Besides the reliability of hardware components, the quality of the software that implements failure recovery actions is important to the overall availability level provided by a storage controller. The RAID technology is one of many approaches to using data redundancy to improve the availability, and potentially the performance, of stored data sets. Data redundancy can take multiple forms. Depending on the level of abstraction in the implementation, one can distinguish between block-level redundancy and volume-level replication. Block-level redundancy can be performed using techniques such as block mirroring (RAID Level 5), parity-based protection (RAID Level 10), or erasure coding. See R. Bhagwan et al., "Total Recall: System Support for Automated Availability Management," in *Proc. of USENIX Conference on Networked Systems Design and Implementations '04*, San Francisco, Calif., March 2004

Block-level redundancy operates below the storage volume abstraction and is thus transparent to system software layered over that abstraction. In contrast, volume-level replication, which involves maintaining one or more exact replicas of a storage volume, is visible (and thus must be managed) by system software layered over the storage volume abstraction. Known technologies to perform volume-level replication include, e.g., FlashCopy® computer hardware and software for data warehousing, for use in the field of mass data storage, from International Business Machines Corporation, and Peer-to-Peer Remote Copy (PPRC).

Manual availability management in large data centers can be error prone and expensive and is thus not a practical solution RAID (see D. Patterson et al., "A Case for Redundant Arrays of Inexpensive Disks (RAID)," Proceedings ACM SIGMOD, Chicago, June 1988) systems, which employ data redundancy to offer increased availability levels over groups of DASDs, operate in mostly a reactive manner and are typically not goal-oriented. Also, they may not easily extend from single controllers to systems of multiple storage controllers The Change Management with Planning and Scheduling (CHAMPS) system, described in A Keller et al., "The CHAMPS System: Change Management with Planning and Scheduling", IBM Technical Report 22882, Aug. 25, 2003, is concerned with how a given change (e.g., a software upgrade of a component) in a distributed system affects other system components and on how to efficiently execute such a change by taking advantage of opportunities for parallelism. CHAMPS tracks component dependencies and exploits parallelism in task graph. While representing a substantial advance in the art, CHAMPS may have limitations regarding consideration of service availability and regarding data availability in distributed storage systems.

There is little prior work on automated availability management systems in environments involving multiple, heterogeneous storage controllers. The Hierarchical RAID (HiRAID) system (see S. H Baek et al., "Reliability and Performance of Hierarchical RAID with Multiple Controllers," in *Proc 20th ACM Symposium on Principles of Distributed Computing (PODC 2001)*, August 2001) proposes layering a RAID abstraction over RAID controllers, and handling change simply by masking failures using RAID techniques. HiRAID may not be optimally goal-oriented and may focus on DASD failures only (i.e., as if DASDs attached to all storage controllers were part of a single DASD pool). It may not take into account the additional complexity and heterogeneity of the storage controllers themselves and thus may not be appropriate in some circumstances.

Other approaches may also inadequately characterize storage controller availability For example, Total Recall (see R Bhagwan et al., "Total Recall: System Support for Automated Availability Management", in *Proc. of USENIX Conference on Networked Systems Design and Implementations '04*, San Francisco, Calif., March 2004) characterizes peer-to-peer storage node availability simply based on past behavior and treats all nodes as identical in terms of their availability profiles; it is thus more appropriate for Internet environments, which are characterized by simple storage nodes (e.g., desktop PCs) and large "churn", i.e., large numbers of nodes going out of service and returning to service at any time, rather than enterprise environments and generally heterogeneous storage controllers. Another related approach applies Decision Analysis theory to the design of archival repositories. See A Crespo and H. Garcia-Molina, "Cost-Driven Design for Archival Repositories," Proceedings of the 1st ACM/IEEE-CS Joint Conference on Digital Libraries, Roanoke, Va., 2001. This is a simulation-based design framework for evaluating alternatives among a number of possible configurations and choosing the best alternative in terms of reliability and cost. Prior work within this framework, however, has not addressed the heterogeneity and complexity issues in large scale storage systems or the problem of storage volume placement on a set of storage controllers.

Existing provisioning systems such as IBM's Volume Performance Advisor (VPA) take into account capacity and performance considerations primarily when recommending volume allocations. While VPA represented a substantial advance in the art, it may not have appropriate provision for availability goals.

It would thus be desirable to overcome the limitations in previous approaches

SUMMARY OF THE INVENTION

Principles of the present invention provide techniques for controlling a computer storage system In one aspect, an exemplary method includes the steps of obtaining deterministic component availability information pertaining to the system, obtaining probabilistic component availability information pertaining to the system, and checking for violation of availability goals based on both the deterministic component availability information and the probabilistic component availability information.

In another aspect, an exemplary method includes the steps of obtaining a request for change, obtaining an estimated replication time associated with a replication to accommodate the change, and taking the estimated replication time into account in evaluating the request for change The methods can be computer-implemented The methods can advantageously be combined.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

One or more embodiments of the invention may provide one or more beneficial technical effects, such as, for example, automatic management of availability and performance goals in enterprise data centers in the face of standard maintenance and/or failure events, automatic management of storage consolidation and migration activities, which are standard parts of IT infrastructure lifecycle management, and the like.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
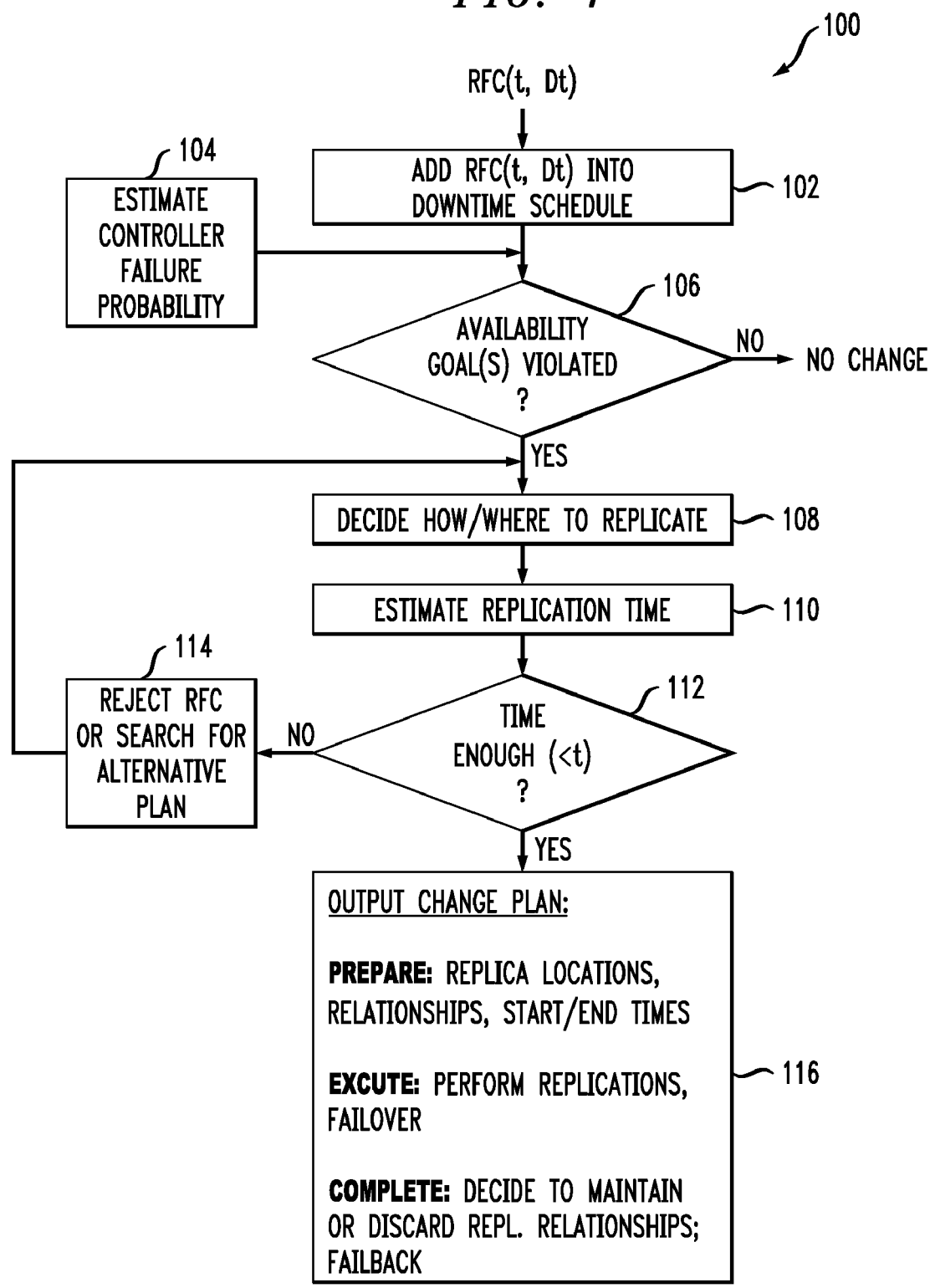
FIG. 1 is a flowchart showing exemplary method steps according to an aspect of the invention.

FIG. 1 shows a flowchart 100 with exemplary method steps for controlling a computer storage system, according to an aspect of the invention. The method can be computer-implemented. Step 102 includes obtaining deterministic component availability information pertaining to the system, for example, a calendar time t and a duration Dt associated with a request for change RFC. The request for change RFC (t, Dt) can be added into a downtime schedule. Step 104 includes obtaining probabilistic component availability information pertaining to the system, e.g., an estimated controller failure probability. In decision block 106, a check is made for violation of availability goals, based on both the deterministic component availability information and the probabilistic component availability information.

As shown at the "NO" branch of block 106, an additional step includes maintaining the current status, responsive to the block 106 checking indicating no violation of the availability goals. In the case of the "YES" branch of block 106, additional step 108 includes determining replication parameters, responsive to the block 106 checking indicating a violation of the availability goals. The replication parameters can include at least how to replicate and where to replicate As noted, obtaining deterministic component availability information pertaining to the system can include obtaining a request for change. Step 110 can include obtaining an estimated replication time. Decision block 112 can be employed to take the estimated replication time into account in evaluating the request for change. Specifically, in block 112, it can be determined whether sufficient time is available to replicate to accommodate the request for change. At block 114, responsive to said determining step indicating that sufficient time is not available, the request for change can be rejected, and/or an alternative plan to accommodate the request for change can be searched for.

At block 116, responsive to the determining step 112 indicating that sufficient time is indeed available, a change plan can be developed. The change plan can include, e.g., one or more of: (i) preparation information indicative of replica locations, relationships, and timing; (ii) execution information indicative of replication performance; (iii) failover detection information indicative of how to execute necessary failover actions no later than a time of an action associated with the request for change; (iv) completion information indicative of replication relationship maintenance and discard; and (v) information indicative of how to execute necessary failback actions no earlier than a time of another action associated with the request for change.

For example, with regard to (iii), the plan can provide the details of how to execute the necessary failover actions prior to or at the time of a failure or maintenance action, i.e., the switch over from the original storage volumes to their replicas on functioning storage controllers. With regard to (v), the plan can provide the details of how to execute the necessary failback actions at the time or after recovery or completion of a maintenance action, i.e., the switch over from replicas to the original volumes.

The concept of taking replication time into account can be implemented separately from, or together with, the concept of using both probabilistic and deterministic information. Thus, in one or more exemplary embodiments, an inventive method could include steps of obtaining a request for change as at block 102, obtaining an estimated replication time associated with a replication to accommodate the change, as at block 110, and taking the estimated replication time into account in evaluating the request for change. The latter can include, e.g., one or more of steps 112, 114, and 116 In this invention, we focus on datasets whose requirements (in terms of either capacity, or performance, or availability) exceed the capabilities of individual storage controllers and thus must be spread over multiple storage controllers.

It will be appreciated that in storage systems that comprise multiple storage controllers (an architecture often referred to as "Scale-Out"), one faces the problem of maintaining desired dataset availability levels in the face of storage controller downtime Downtime can be caused either by scheduled maintenance actions or by unexpected failure of one or more storage controllers One reason that the benefits of the RAID technology cannot simply extend from groups of multiple DASDs to groups of multiple storage controllers is that storage controllers are significantly more complicated devices than individual DASDs and in general tend to exhibit downtime more frequently and for a wider variety of reasons (besides component failure) compared to DASDs; in addition to the complexity of individual storage controllers, groups of storage controllers in data centers are typically more heterogeneous than groups of DASDs inside RAID arrays. Given this degree of complexity and heterogeneity, the problem of deciding the right amount of data replication (how many data replicas to create and on which storage controllers to place them) for a given dataset, as well as how to react to storage controller unavailability, can be effectively addressed by one or more inventive embodiments in a process that takes these factors (i.e., storage controller complexity, heterogeneity) into account One or more embodiments of the invention may offer a proactive solution to maintaining the availability levels of datasets by dynamically and continuously determining the availability of individual storage controllers using a combination of statistical (probabilistic) and deterministic methods. Given such availability characterization of individual controllers, one or more exemplary inventive methods can periodically analyze the impact of probable or anticipated changes and come up with a change plan to maintain the availability goals of datasets. This can typically be accomplished without conflicting with existing reactive high-availability systems, such as RAID; in fact, one or more inventive embodiments can co-exist with and leverage these systems, which typically operate within individual storage controllers.

The probabilistic methods used in one or more embodiments of the invention can take into account past observations of controller availability (e.g., how many and what type of unavailability intervals has each controller undergone in the past), operator beliefs (e.g., operator believes that controller is vulnerable during a probation period immediately after it has undergone a firmware upgrade), as well as the state of storage controller configuration (e.g., how many standby and/or hot spare DASDs are currently available to mask an active-DASD failure; how many redundant storage controller system-boards and internal data-paths between controller system-boards and DASD arrays are in place) in coming up with a probabilistic estimate of future availability The deterministic methods employed in one or more embodiments of the invention take into account exact information about forthcoming changes, such as scheduled storage controller maintenance actions, which can be submitted by system operators and/or administrators via the aforementioned RFC One or more embodiments of the invention can combine controller availability measures estimated by the deterministic and probabilistic methods and come up with a volume placement plan (i.e., how many replicas to create and on which controllers to place them) and a change management plan (i.e., what type of failover and failback actions to invoke as a response to controllers going out of service or returning to service).

Still with reference to FIG. 1, it will be appreciated that the "Decide how/where to replicate" block 108 and "Output Change Plan" block 116 are of significance for the system administrator and/or manager The "Add RFC" block 102 and the "Estimate controller failure probability" block 104 can be thought of as triggers. One of mole inventive embodiments can come up with a placement and a change plan which are feasible.

In an exemplary embodiment, we can assume that a dataset is implemented as a collection of storage volumes $VG=\{v_1, v_2, \ldots, v_n\}$, spread over multiple storage controllers. A dataset can potentially be accessible to one or more host servers and used by applications installed on these servers.

The desirable availability level of a dataset can be expressed as the ratio of the expected "uptime" (i.e., the time that the dataset is or expected to be accessible to applications on host servers) over the total amount of time considered. The dataset is considered unavailable (i.e., inaccessible to applications) if at least one storage volume in the collection VG is unavailable. For example, if T is the present time and $\Delta t = t - T$ is a future time interval (e.g., a day, a month, or a year), over which the dataset is unavailable for time $\Delta t_{outage}$, then the availability of a data set is defined as:

$$\text{Availability} = (T - t - \Delta t_{outage})/(T - t) \quad (1)$$

For the purpose of this description, dataset availability is measured as a percentile; for example, availability of 99.99% or 0.9999 (otherwise referred to as "four 9s") over a period of a month means that the maximum tolerated downtime cannot exceed about five minutes. The outage in the above formula can be caused by downtime of storage controllers, which may or may not have been anticipated. Anticipated downtime can be caused by scheduled maintenance operations. Unanticipated downtime is typically caused by failures of hardware or software components or by operator errors. One or more inventive methods can rely on the continuous characterization of the availability of individual storage controllers, based on deterministic and probabilistic calculations.

Deterministic Storage Controller Availability Estimate

In deterministic calculations, one or more embodiments of the invention use exact information about future downtime at time $t_i$ and for a duration $\Delta t_i$ to calculate the operational availability (represented by the symbol $A_d$) of a dataset based on estimates of the mean-time-between-maintenance (MTBM) and the mean-downtime (MDT) measures, as follows:

$$A_d = \text{MTBM}/(\text{MTBM} + \text{MDT}) \quad (2)$$

Probabilistic Storage Controller Availability Estimate

In probabilistic calculations, one or more embodiments of the invention combine information such as:

a. Statistical characterization of the past behavior of controllers (i.e., using a controller's past uptime as an indication of its future expected uptime) This estimate will henceforth be represented by the symbol $\mu_\alpha$ b. The availability characterization of a storage contoller. This characterization, however, can involve a variety of factors such as: (i) the ability of the current configuration of the storage controller to sustain a number of faults (e.g., how many spare DASDs are currently in place and available and/or tested to mask an active-DASD failure); (ii) the availability behavior of the controller software (e.g., what is the degraded performance behavior of the controller when handling a failover action); (iii) the number of operational redundant data-paths within the controller; (iv) the number of operational redundant data-paths between the controller and the host(s) accessing data on that controller In one or more embodiments of the invention we encapsulate our belief in a controller's availability as a function of its operating configuration as a Bayesian probability. This estimate will henceforth be represented by the symbol $\mu_\beta$.

c. Operator belief regarding a controller's future availability, taking into account empirical rules such as the "infant mortality" effect, according to which a controller is considered to be particularly vulnerable to a failure in the time period immediately after a software upgrade. Similar to (b), this is also a Bayesian probability. This estimate will henceforth be represented by the symbol $\mu_\gamma$. The skilled artisan is familiar with the concept of infant mortality from, for example, J Gray, "Why do Computers Stop and What Can We Do About It?," in *Proceedings of the 6th International Conference on Reliability and Distributed Databases*, June 1987.

The probability $\mu$ that a controller will be available in the future can be estimated from (a)-(c) above. This estimate of controller availability can be used in probabilistic calculations to derive a probabilistic estimate for the availability of an entire data set.

Statistical/probabilistic and deterministic information as described above can be used to estimate the degree of availability of a storage controller. There are multiple options regarding how to combine these sources of information By way of example, one option is to take the minimum estimate among the deterministic estimate and (a)-(c).

$$\text{Controller Availability} = \min(\mu_\alpha, \mu_\beta, \mu_\gamma, A_d) \quad (3)$$

Binding the estimate of controller availability to the strictest estimate available, as expressed in the formula above, is expected to work well.

Storage Volume Allocation and Placement Algorithms

In what follows, exemplary inventive techniques for placing a set of storage volumes on a set of storage controllers in order to achieve a certain availability goal are presented, based on volume-level replication (i.e., each volume potentially being continuously replicated—or mirrored—to one or more other storage volumes on zero or more other storage controllers). According to this embodiment, for each volume $v_i$ in a dataset that comprises a set of volumes VG (i.e., the set of primary volumes), $v_i$ may be replicated one or more times to volumes $v_{i1}$ $v_{i2}$, etc, which are members of a replica-set VG'.

$$VG = \{v_1, v_2, \ldots, v_n\} \; VG' = \{v_{11}, v_{12}, \ldots, v_{21}, v_{22}, \ldots, v_{n1}, v_{n2}, \ldots\}. \quad (4)$$

Note that even though a volume may be replicated one or more times, outage (i.e., data inaccessibility) is still possible on the dataset when the storage controller that contains the primary volume fails or is taken out of service. This outage is unavoidable in most cases, and due to the amount of time it takes to failover to the secondary storage volume replica. This time depends on the replication technology and the particular storage infrastructure used.

One problem that can be addressed in this embodiment is the determination of the number of storage volumes (i.e., number of primary volumes and replicas), as well as their placement on storage controllers, to achieve the set availability goals. A two phases approach can be used: (i) in the first phase, the initial placement of volumes is decided based on capacity and performance goals only, producing the set VG and the mapping between volumes in VG and storage controllers, and (ii) in the second phase, the storage volumes are replicated as necessary to achieve the data availability goals. This phase results in the set VG' as well as the mapping between volume replicas and storage controllers.

Initial Placement Phase

The first (initial placement) phase can be performed purely based on capacity and performance considerations and using known methods, such as the well-known and aforementioned IBM Volume Performance Advisor Such placement of volumes to storage controllers, however, may not fully satisfy the availability goals for the dataset, which is why a second (data replication) phase may be necessary Data Replication Phase Following the initial placement phase, data replication can be used to achieve the availability goals. This embodiment determines the degree of data replication necessary to achieve the availability goals (e.g., how many replicas of a volume are needed) as well as the placement (e.g., which storage controller to place a volume replica on) In addition, an implementation plan for executing these changes is presented One principle in this phase is to progressively improve the overall availability of a dataset by iteratively replicating storage volumes across storage controllers until the availability goal is reached. The process starts by calculating the initial—baseline—availability of the dataset VG without any replication. The availability can then be improved by selecting a storage volume from a storage controller with a low degree of availability (preferably, the lowest between any controller with volumes in VG) and deciding on which controller to replicate this volume to increase the overall dataset availability The availability can further be improved by replicating other volumes or by replicating certain volumes more than once By iteratively growing the set VG' (by selecting a volume in VG and replicating it on some other controller) one can monotonically improve the availability of the dataset until the availability goal is eventually reached.

In general, given a storage volume A, the choice of the controller that can host a replica of A (henceforth the replica is referred to as A') is made using the following criteria. First, to minimize cost, it should be a storage controller with similar or lower availability if possible (i.e., it need not be a controller offering a much higher quality of service). Note that controller availability is estimated using the combination of deterministic and probabilistic methods described earlier. Second, simple deterministic considerations dictate that the scheduled outages of the two controllers hosting A, A' should not be overlapping at any point in time (see Timelines in FIGS. 4 and 5 of Example 2). In addition, there must be sufficient time distance between any outages for volumes A, A' to make their re-synchronization possible after a failure. The time necessary to synchronize two storage volume replicas is estimated taking into account the replication technology, the amount of data that needs to be transferred, and the data transfer speed Given a set of storage controllers that could be potential candidates to host replica A', this embodiment examines each candidate controller in some order (e.g., in random order) and determines whether the availability of the resulting dataset (calculated using the combined prediction of the deterministic and probabilistic methods) achieves the desired target. Besides the use of probabilistic formulas as demonstrated in Example 1 below, a potentially more accurate way to estimate overall availability is the use of simulation-based Decision Analysis, which was used in the aforementioned Crespo reference for the design of archival repositories. Such an analysis would be based on event-based simulations using the probabilistic estimates of storage controller availability (sources (a)-(c) described earlier). A drawback of this method is that it may not be suitable in an online scenario where near-immediate response is needed. In those cases, straightforward use of the probabilistic formulas (as described in Example 1 below) may be more appropriate.

The process that was just described can be repeated for all storage volumes in a dataset VG to eventually produce the set VG' and the associated mappings between storage volumes and storage controllers. In cases where no singly-replicated solution (i.e., where no volume can have more than one replica) exists that achieves the availability goal of a dataset, an alternative option is to attempt a solution where some of the volumes are doubly (or higher) replicated, on three (or more) controllers.

In general, one of the volumes in a set of replicas is designated as the primary; this is the replica that is to be the first active representative of the set This is usually determined to be the storage volume on the controller with the latest scheduled downtime.

After the initial placement of volumes from VG and VG' to storage controllers, the exemplary method periodically checks whether the availability goals of the data set are maintained in light of the most recent and up-to-date availability characterizations of storage controllers and RFCs submitted by operators (refer back to FIG. 1 for one example). When the availability level of a storage controller changes (e.g., it either goes into the "watch-list" due to some configuration change or one or more RFCs on it are submitted), the availability level of one or more datasets (those who have one or more storage volume replicas stored on that controller) is expected to change and thus new storage volume replicas will most likely have to be created.

One particularly interesting case in practice is that of "draining" (i.e., removing all volumes from) a storage controller. In this case, all storage volumes from that storage controller must be moved to other controllers, which may further require the creation and placement of replicas This case can be treated using the general process described earlier. Note however, that the migration of storage volumes between controllers involves data movement, which can be a slow process for large volumes.

When an administrator wants to introduce a new controller outage with an RFC(t, Δt), an alternative time t may be proposed by RAIC if that will result in significantly lower system impact (e.g., fewer replica creations or less data movement) If the operator/administrator insists on the original RFC specification, new replicas will proactively be built to guard against data unavailability at the expense of disk space dedicated to redundant data.

When a controller returns into service after being inaccessible, its storage volumes must typically be re-synchronized with any of the replica(s) they may have on other controllers. Note that continuous replication and re-synchronization can be performed in the background and do not directly affect availability.

By way of review, the method as described above can be visualized in connection with the flow chart of FIG. 1 The proposed embodiment maintains information about availability characteristics of storage controllers (as described earlier) and listens for (a) requests for change RFC(t, Δt) in the status of a storage controller; an RFC may or may not specify the time of the change t but should specify an estimate on the duration of change Δt; (b) other events that may signal changes in the availability characteristics of storage controllers; examples include hardware or software controller failures, operator errors, or revised beliefs on the controller's ability to sustain failures For each submitted controller RFC or updated information about system status, the method checks whether any availability goals are violated If so, volume(s) may be replicated as necessary. Besides purely availability-based estimates, the replication plan may also reflect business rules based on policy, e.g., use higher-quality controllers for important data A typical availability management plan includes three phases: PREPARE, EXECUTE, and COMPLETE These phases handle the mechanics of implementing the solution proposed by the techniques described earlier and are specific to the replication technologies used in the particular deployed infrastructure The PREPARE phase is relevant prior to a controller failure or shutdown and involves creating and synchronizing replicas and setting up the necessary replication relationships.

The EXECUTE phase becomes relevant at the time that a controller fails or shuts down and involves handling the failover action to secondary replicas The objective of this phase is to reestablish the availability of a dataset by masking volume failures and by redirecting data access to surviving storage volumes.

The COMPLETE phase becomes relevant at the time a storage controller that was previously taken out of service recovers and re-enters service. This phase involves resuming (or discarding, if deemed to be stale) replication relationships, re-synchronizing storage volumes, and optionally "failing back" data access into the recovered storage volumes.

Following are examples of both probabilistic and deterministic availability calculations. These are purely illustrative in nature, to aid the skilled artisan in making and using one or more inventive embodiments, and are not to be taken as limiting.

EXAMPLE 1

Figure 2:
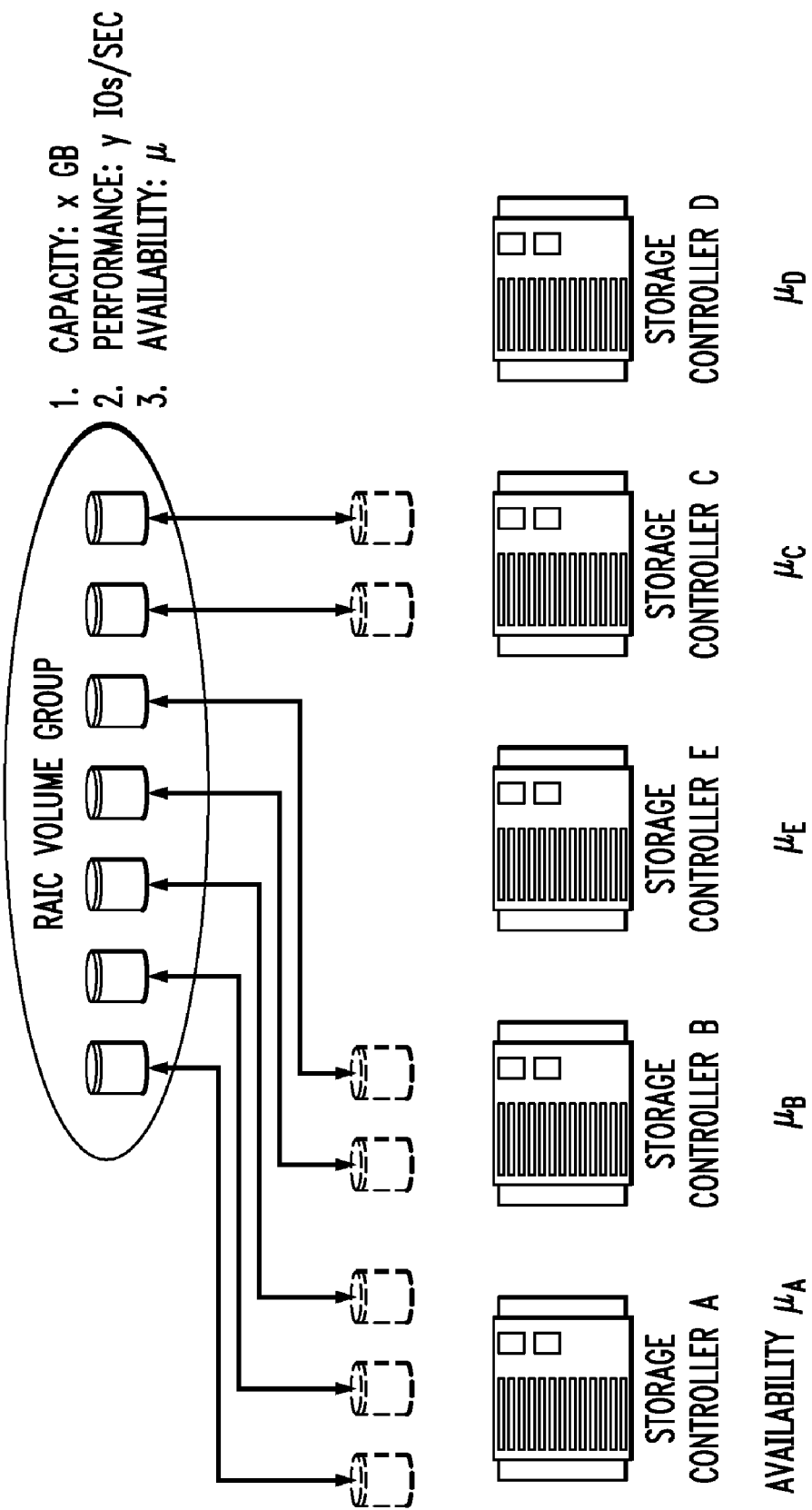
FIG. 2 shows an example of initial volume placement according to probabilistic information.
Figure 3:
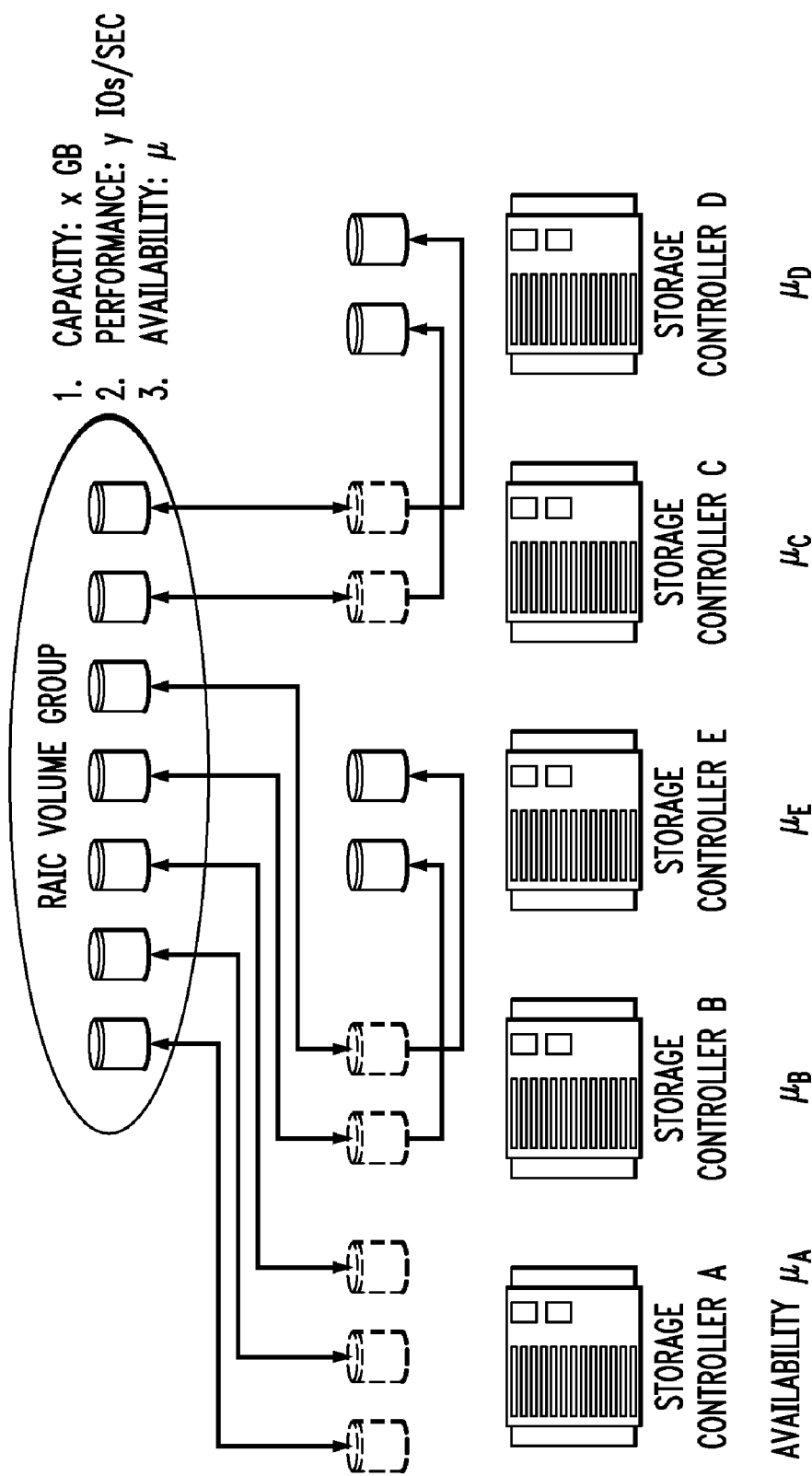
FIG. 3 shows an example of volume replication for availability according to probabilistic information.

With reference to FIGS. 2 and 3, consider five storage controllers A, B, C, D, E with availability $\mu_A$, $\mu_B$, $\mu_C$, $\mu_D$, $\mu_E$, respectively. In this example, we allocate a dataset of size x GB with performance y IO/s and overall availability $\mu$ using the volume allocation and placement procedure described earlier. In the first (initial allocation) phase, seven volumes are allocated based on capacity and performance considerations on three controllers (A, B, C). Following initial allocation, in the second phase of the allocation algorithm, volumes from controllers B and C (presumably the controllers with the lowest availabilities $\mu_B$ and $\mu_c$) are selected to be replicated to equal number of volumes on controllers D, E The estimate of the overall probability is based on the following theorem from the Theory of Probabilities, which states that for any two events A and B, the probability that either A or B or both occur is given by:

$$Pr\{A \text{ or } B\} = Pr\{A\} + Pr\{B\} - Pr\{A \text{ and } B\} \quad (5)$$

Assuming A and B are independent events:

$$Pr\{A \text{ or } B\} = Pr\{A\} + Pr\{B\} - Pr\{A\} \times Pr\{B\}. \quad (6)$$

Assuming that storage controllers fail independently and that a pair of controllers is unavailable if both controllers are unavailable:

$$\begin{aligned}
\text{Availability} &= Pr\left\{\begin{array}{l} A \text{ and Pair } B, E \text{ and} \\ \text{Pair } C, D \text{ are available} \end{array}\right\} = \\
&= 1 - Pr\left\{\begin{array}{l} A \text{ or Pair } B, E \text{ or} \\ \text{Pair } C, D \text{ are unavailable} \end{array}\right\} \\
&= 1 - Pr\{A \text{ unavailable}\} - \\
&\quad Pr\{\text{Pair } B, E \text{ or Pair } C, D \text{ are unavailable}\} + \\
&\quad Pr\{A \text{ unavailable}\} \times \\
&\quad Pr\{\text{Pair } B, E \text{ or Pair } C, D \text{ are unavailable}\}
\end{aligned} \quad (7)$$

-continued $$= 1 - \mu_A - Pr\{(1 - \mu_B)(1 - \mu_E) + (1 - \mu_C)$$
$$(1 - \mu_D) - (1 - \mu_B)(1 - \mu_C)(1 - \mu_D)$$
$$(1 - \mu_E)\} + \mu_A \times Pr\{(1 - \mu_B)(1 - \mu_E) +$$
$$(1 - \mu_C)(1 - \mu_D) - (1 - \mu_B)(1 - \mu_C)(1 - \mu_D)$$
$$(1 - \mu_E)\}$$

The above formula (or a similarly derived formula adapted to a given configuration of replication relationships and number and type of controllers) can be used to determine the availability of the data set By way of review, in FIG. 2, a data set can be spread over five storage controllers (labeled A-D). Each controller is characterized by availability $\mu_A$-$\mu_E$. The data set comprises 7 storage volumes initially spread over three storage controllers (A, B, and C); this initial allocation is decided based on capacity (xGB) and performance (e.g., y IOs/sec) goals, using known techniques such as VPA. The availability goal ($\mu$) of the data set can be satisfied as described herein. The resulting placement satisfying the availability goal ($\mu$) is shown in FIG. 3.

EXAMPLE 2

Figure 4:
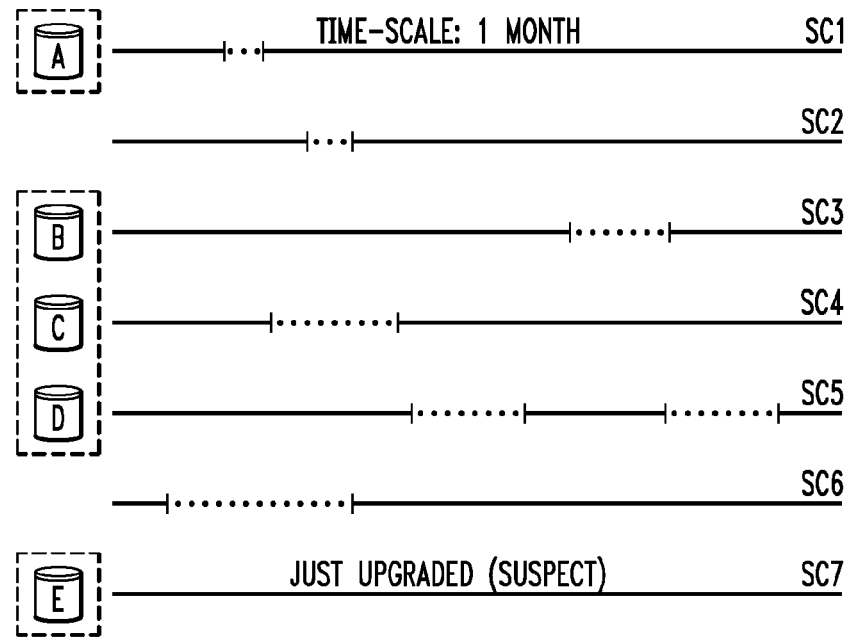
FIG. 4 shows an example of initial volume placement according to deterministic information.
Figure 5:
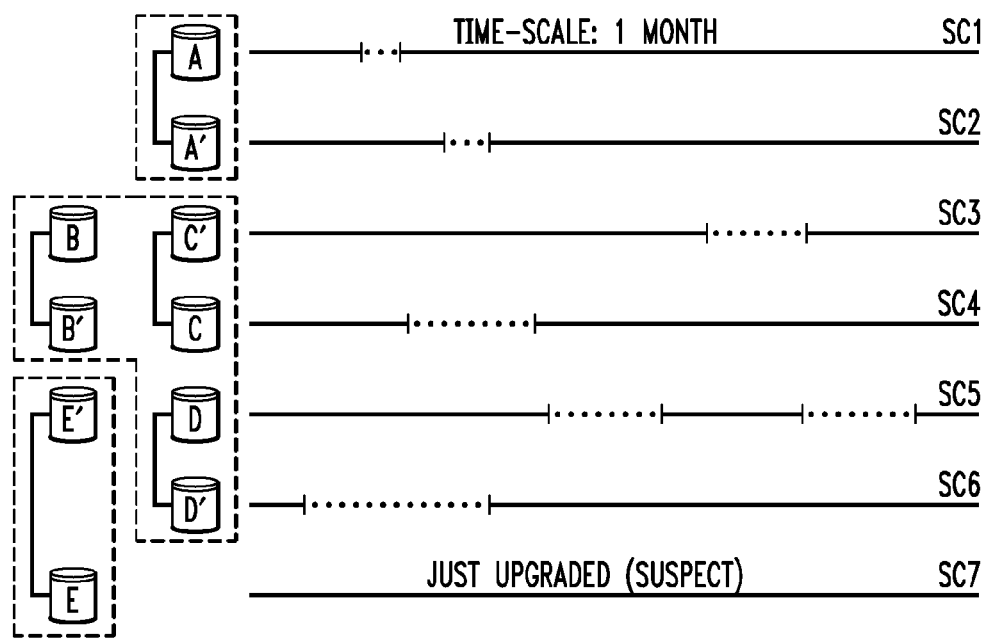
FIG. 5 shows an example of volume replication for availability according to deterministic information.

Referring to FIGS. 4 and 5, consider three datasets with different availability goals (0.9999, 0.999, and 0.9 from top to bottom). Consider also seven controller's (SC1-SC7) each with a different availability outlook expressed in their timeline of known, expected outages. The timelines in FIG. 4 describe the known, expected outages for each controller. For the first six controllers we use mostly deterministic information. The last controller (SC7), for which there is no known outage, is considered suspect due to a recent firmware upgrade. Its probabilistic availability estimate is therefore low As in the previous example, in the first (initial allocation) phase of the algorithms, volumes for each dataset are assigned to storage controllers based on capacity and performance goals. For the first dataset, a single volume (A) is allocated on SC1 For the second dataset, three volumes (B, C, and D) are allocated on SC3-SC5 Finally, for the third dataset a single volume (E) is allocated SC7.

In this example, an additional effort is made in the initial phase to try to perform the initial allocation on a storage controller whose availability is as close as possible to the overall dataset availability goal. For example, volume A is assigned to the controller with the highest availability (SC1) since that controller most closely approximates (but falls short off) the dataset's availability goal.

Once the initial allocations are complete, in the second phase of the algorithm we turn our attention to using volume replication to satisfy the availability goals. Observing that the availability goal of the first volume group is quite ambitious (four 9's over one month implies outage of only about 4-5 minutes over the same time interval), storage volume A must be replicated on another highly-available controller. The technique thus selects storage controller SC2 for hosting A', the replica of A. Similarly, for the second data set, the algorithm chooses storage controllers SC4, SC3, and SC6 to progressively improve the availability of that data set by replicating volumes B, C, and D (to B', C', and D'), respectively. Finally, the algorithm selects SC5 to replicate volume E on SC7 and reach the availability goal of the third dataset.

By way of review, in FIG. 4, there are three volume groups with different availability goals ($\mu$=0.9999 for the VG that includes storage volume A, $\mu$=0.999 for the VG that comprises B, C, and D, and $\mu$=0.9 for the VG that includes volume E). These volumes must be placed on any subset of 7 controllers, listed in order of availability. Each timeline describes the outages for each controller We first assign volumes to storage controllers based on capacity and performance goals, while trying to get as close as we can to the availability goal. Four 9's over one month implies outage of only about 4-5 minutes. The controllers with the highest operational availability cannot provide this kind of service, so a storage volume must be replicated on two such controllers In choosing a controller for the replica, to minimize cost, it should be a controller with similar availability. The outages should not be overlapping and there should be sufficient distance between outages for volumes to be re-synchronized. If a volume falls out of sync and it is scheduled to become primary next, it should be synchronized. In FIG. 5, primed volumes (e.g., A') designate secondary replicas. The primary volume should be on the controller that will have its first failure later than the other; RAIC should ensure that there is enough time between the time that A comes back in service to the time A' disappears so that A can go back in sync. Typically, the only outage time that affects operational availability is the failover time from A' to A. Everything else can typically be done in the background and thus does not affect availability.

A variety of techniques, utilizing dedicated hardware, general purpose processors, firmware, software, or a combination of the foregoing may be employed to implement the present invention One or more embodiments of the invention can be implemented in the form of a computer product including a computer usable medium with computer usable program code for performing the method steps indicated Furthermore, one or more embodiments of the invention can be implemented in the form of an apparatus including a memory and at least one processor that is coupled to the memory and operative to perform exemplary method steps.

Figure 6:
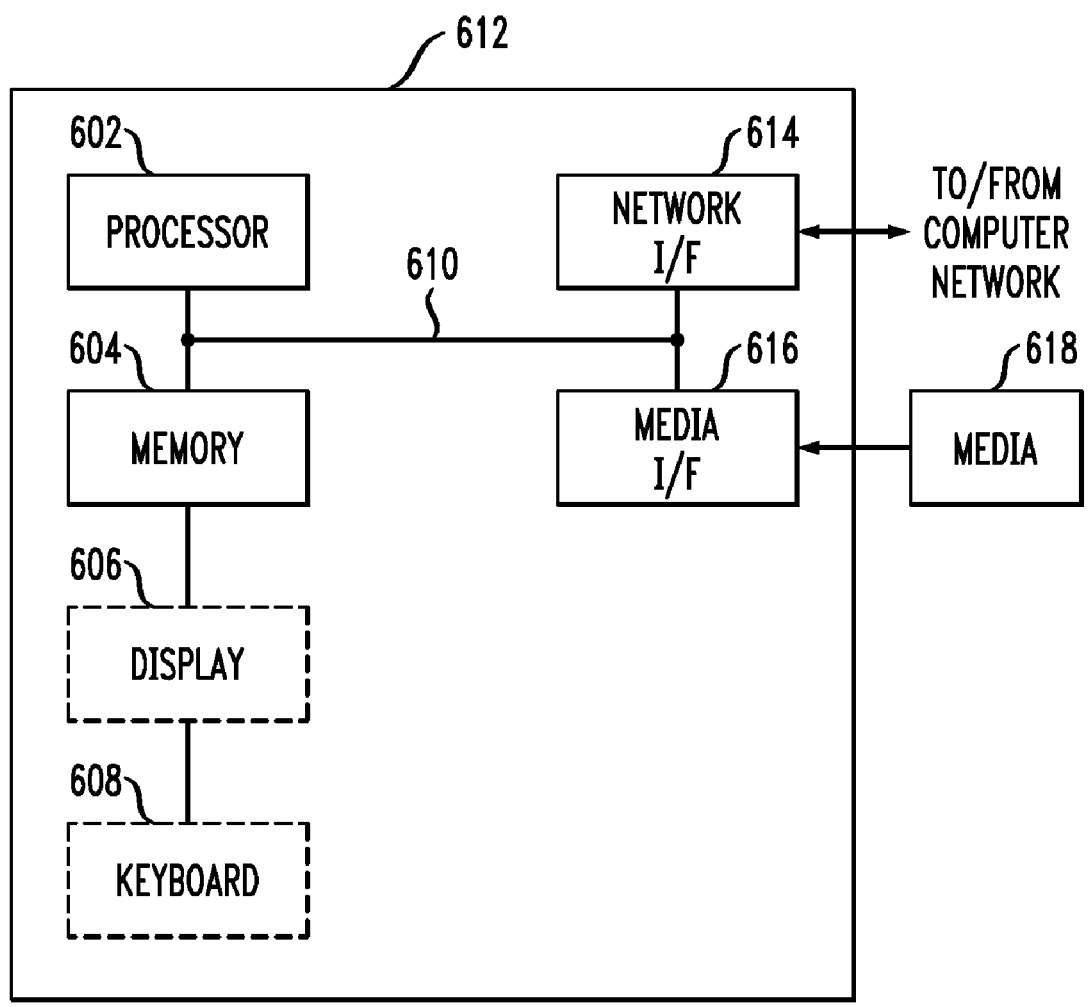
FIG. 6 depicts a computer system that may be useful in implementing one or more aspects and/or elements of the present invention

At present, it is believed that one or more embodiments will make substantial use of software running on a general purpose computer or workstation. With reference to FIG. 6, such an implementation might employ, for example, a processor 602, a memory 604, and an input/output interface formed, for example, by a display 606 and a keyboard 608 The term "processor" as used herein is intended to include any processing device, such as, for example, one that includes a CPU (central processing unit) and/or other forms of processing circuitry. Further, the term "processor-" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory and the like. In addition, the phrase "input/output interface" as used herein, is intended to include, for example, one or more mechanisms for inputting data to the processing unit (e.g., mouse), and one or more mechanisms for providing results associated with the processing unit (e.g., printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like Furthermore, the invention can take the form of a computer program product accessible from a computer-usable or computer-readable medium (e.g., media 618) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, inflated, or semiconductor system (or apparatus or device) or a propagation medium. Examples of a computer-readable medium include a semiconductor or solid-state memory (e.g., memory 604), magnetic tape, a removable computer diskette (e.g., media 618), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 602 coupled directly to indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for controlling a computer storage system, comprising the steps of:
   obtaining deterministic component availability information pertaining to said system;
   obtaining probabilistic component availability information pertaining to said system;
   checking for violation of availability goals based on both said deterministic component availability information and said probabilistic component availability information;
   determining replication parameters, responsive to said checking indicating a violation of said availability goals; and
   placing a set of storage volumes on a set of storage controllers, wherein said placement satisfies said availability goals, said placing comprising:
      determining an initial placement of said storage volumes on said storage controllers based on capacity and performance goals; and
      replicating said storage volumes, responsive to said availability goals.

2. The method of claim 1, further comprising the additional step of maintaining a current status, responsive to said checking indicating no violation of said availability goals.

3. The method of claim 1, wherein said replication parameters comprise at least how to replicate and where to replicate.

4. The method of claim 1, wherein said obtaining deterministic component availability information pertaining to said system comprises obtaining a request for change, further comprising the additional step of obtaining an estimated replication time.

5. The method of claim 4, further comprising the additional step of taking said estimated replication time into account in evaluating said request for change.

6. The method of claim 5, wherein said taking into account comprises:
   determining whether sufficient time is available to replicate to accommodate said request for change; and
   responsive to said determining step indicating that sufficient time is not available, rejecting said request for change.

7. The method of claim 5, wherein said taking into account comprises:
   determining whether sufficient time is available to replicate to accommodate said request for change; and
   responsive to said determining step indicating that sufficient time is not available, searching for an alternative plan to accommodate said request for change.

8. The method of claim 5, wherein said taking into account comprises:
   determining whether sufficient time is available to replicate to accommodate said request for change; and
   responsive to said determining step indicating that sufficient time is available, developing a change plan.

9. The method of claim 8, wherein said change plan comprises:
   preparation information indicative of replica locations, relationships, and timing.

10. The method of claim 9, wherein said change plan further comprises:
    execution information indicative of replication performance; and
    failover detection information indicative of how to execute necessary failover actions no later than a time of an action associated with said request for change.

11. The method of claim 10, wherein said change plan further comprises:
    completion information indicative of replication relationship maintenance and discard, and
    information indicative of how to execute necessary failback actions no earlier than a time of another action associated with said request for change.

12. A method for controlling a computer storage system, comprising the steps of:
    obtaining a request for change due to a violation of availability goals based on both said deterministic component availability information and said probabilistic component availability information;
obtaining an estimated replication time associated with a replication to accommodate said change;
determining whether sufficient time is available to replicate to accommodate said request for change; and
taking said estimated replication time into account in evaluating said request for change.

13. The method of claim 12, wherein said taking into account comprises
responsive to said determining step indicating that sufficient time is not available, rejecting said request for change.

14. The method of claim 12, wherein said taking into account comprises
responsive to said determining step indicating that sufficient time is not available, searching for an alternative plan to accommodate said request for change.

15. The method of claim 12, wherein said taking into account comprises
responsive to said determining step indicating that sufficient time is available, developing a change plan.

16. A computer program product comprising a tangible computer readable recordable storage medium having computer useable program code for controlling a computer storage system, said computer program product including:
computer useable program code for obtaining deterministic component availability information pertaining to said system;
computer useable program code for obtaining probabilistic component availability information pertaining to said system;
computer useable program code for checking for violation of availability goals based on both said deterministic component availability information and said probabilistic component availability information;
computer useable program code for determining replication parameters, responsive to said checking indicating a violation of said availability goals; and
computer useable program code for placing a set of storage volumes on a set of storage controllers, wherein said placement satisfies said availability goals, said placing comprising:
determining an initial placement of said storage volumes on said storage controllers based on capacity and performance goals; and
replicating said storage volumes, responsive to said availability goals.

17. The computer program product of claim 16, wherein said computer useable program code for obtaining deterministic component availability information pertaining to said system comprises computer useable program code for obtaining a request for change, further comprising:
computer useable program code for obtaining an estimated replication time; and
computer useable program code for taking said estimated replication time into account in evaluating said request for change.

18. A computer program product comprising a tangible computer readable recordable storage medium having computer useable program code for controlling a computer storage system, said computer program product including:
computer useable program code for obtaining a request for change due to a violation of availability goals based on both said deterministic component availability information and said probabilistic component availability information;
computer useable program code for obtaining an estimated replication time associated with a replication to accommodate said change;
computer useable program code for determining whether sufficient time is available to replicate to accommodate said request for change; and
computer useable program code for taking said estimated replication time into account in evaluating said request for change.

19. The computer program product of claim 18, wherein said computer useable program code for taking said estimated replication time into account comprises:
computer useable program code for determining whether sufficient time is available to replicate to accommodate said request for change; and
computer useable program code for rejecting said request for change, responsive to said computer useable program code for determining indicating that sufficient time is not available.

20. A method for controlling a computer storage system, comprising the steps of:
obtaining deterministic component availability information pertaining to said system, said obtaining said deterministic component availability information pertaining to said system comprising obtaining a request for change;
obtaining probabilistic component availability information pertaining to said system;
checking for violation of availability goals based on both said deterministic component availability information and said probabilistic component availability information;
determining replication parameters, responsive to said checking indicating a violation of said availability goals;
obtaining an estimated replication time;
taking said estimated replication time into account in evaluating said request for change, said taking into account comprising:
determining whether sufficient time is available to replicate to accommodate said request for change; and
responsive to said determining step indicating that sufficient time is available, developing a change plan, said change plan comprising:
preparation information indicative of replica locations, relationships, and timing;
execution information indicative of replication performance;
failover detection information indicative of how to execute necessary failover actions no later than a time of an action associated with said request for change;
completion information indicative of replication relationship maintenance and discard, and
information indicative of how to execute necessary failback actions no earlier than a time of another action associated with said request for change; and
placing a set of storage volumes on a set of storage controllers, responsive to said availability goals, said placing comprising:
determining an initial placement of said storage volumes on said storage controllers based on capacity and performance goals; and
replicating said storage volumes, responsive to said availability goals.

* * * * *